Sept. 30, 1952     E. B. THOMPSON     2,612,355
VEHICLE HOIST
Filed Nov. 16, 1951     3 Sheets-Sheet 1
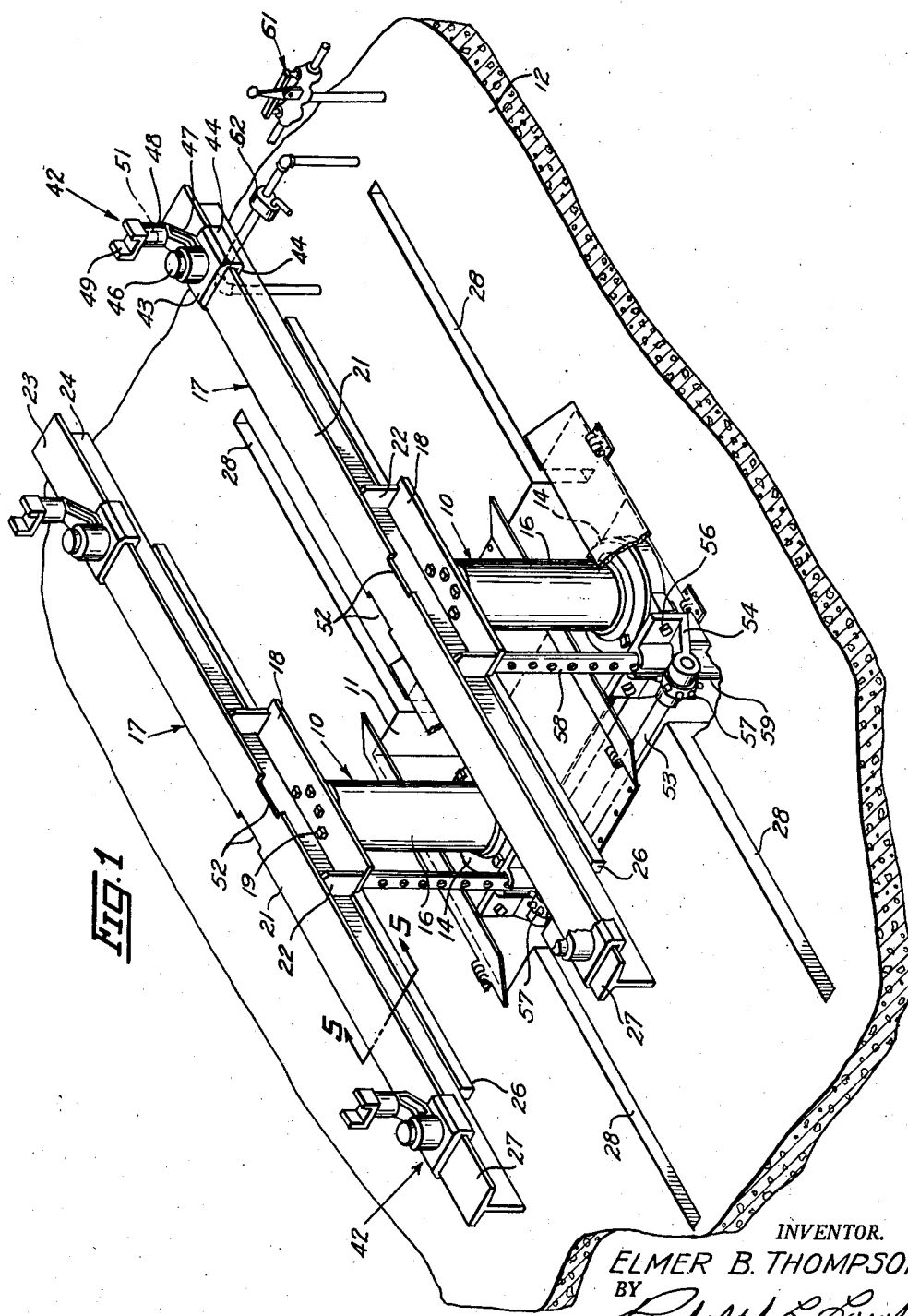
INVENTOR.
ELMER B. THOMPSON
BY
ATTORNEY.

Sept. 30, 1952  E. B. THOMPSON  2,612,355
VEHICLE HOIST
Filed Nov. 16, 1951  3 Sheets-Sheet 2
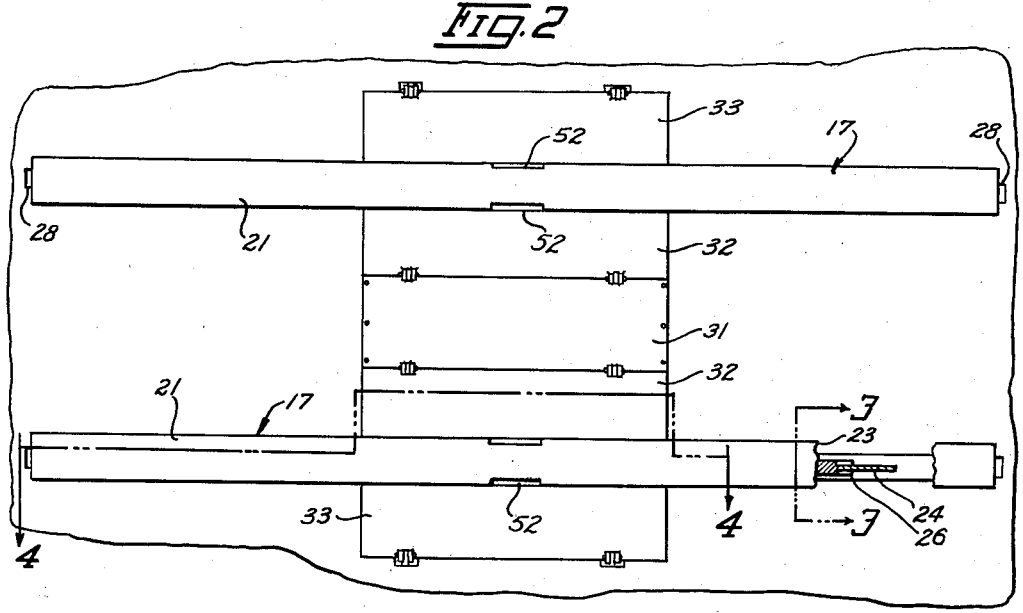
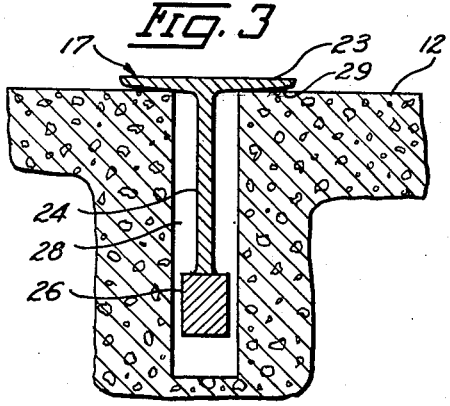
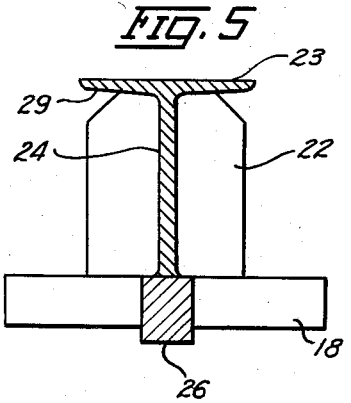
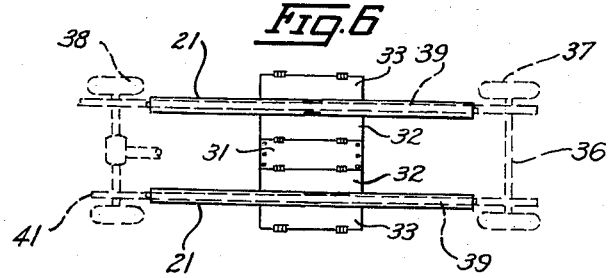
INVENTOR.
ELMER B. THOMPSON
BY
ATTORNEY.

Sept. 30, 1952  E. B. THOMPSON  2,612,355
VEHICLE HOIST
Filed Nov. 16, 1951  3 Sheets-Sheet 3
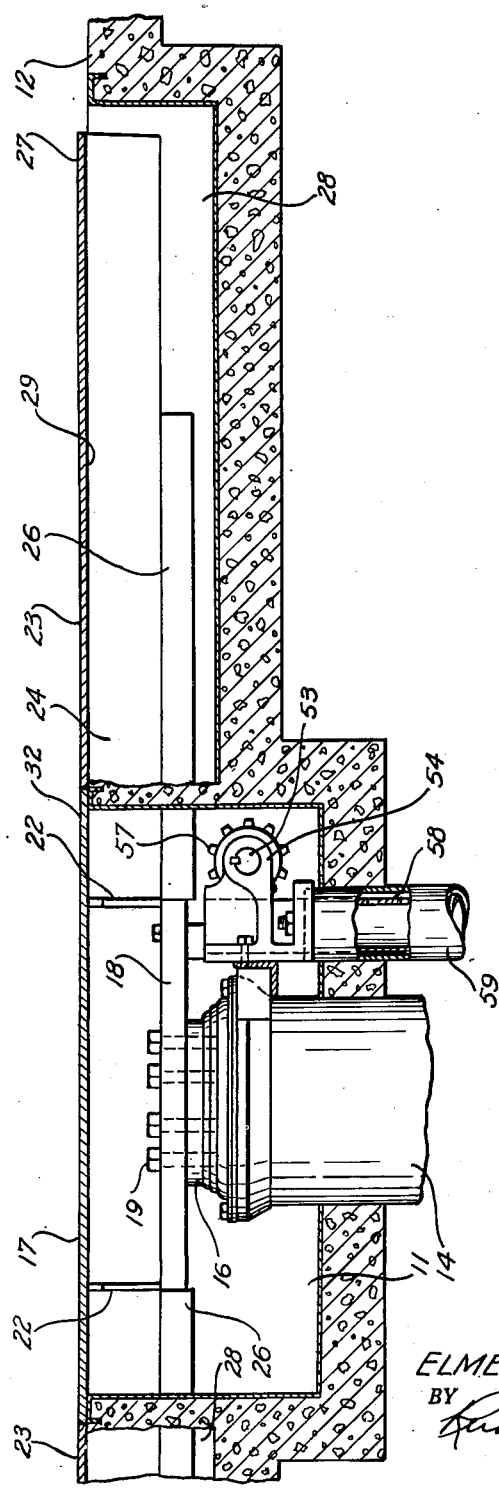
INVENTOR.
ELMER B. THOMPSON
BY
Rudolph L. Lowell
ATTORNEY.

Patented Sept. 30, 1952

2,612,355

UNITED STATES PATENT OFFICE 2,612,355

VEHICLE HOIST

Elmer B. Thompson, Des Moines, Iowa, assignor to Globe Hoist Company, Des Moines, Iowa, a corporation of Iowa Application November 16, 1951, Serial No. 256,671

1 Claim. (Cl. 254—89)

This invention relates generally to vehicle hoists and in particular to a truck hoist for elevating the truck by engagement with the main frame thereof.

An object of this invention is to provide an improved vehicle lift.

A further object of this invention is to provide a truck lift for engaging the truck frame for elevation of the truck to a raised position so as to leave the underside of the truck substantially free and uncovered by the lift structure for lubricating and servicing purposes.

Still another object of this invention is to provide a vehicle lift of a simple and compact construction capable of efficiently elevating the vehicle by engagement with the vehicle frame and which lift, in a raised or lowered position, permits a substantially normal use of the floor space occupied thereby.

Further objects, features and advantages of this invention will become apparent from the following description when taken in connection with the accompanying drawing in which:

Fig. 1 is a perspective view of the lift or hoist of this invention shown in a raised position and with certain parts broken away to more clearly show its construction;

Fig. 2 is a plan view showing the hoist in a lowered position;

Fig. 3 is an enlarged transverse sectional view as seen on the line 3—3 in Fig. 2;

Fig. 4 is an enlarged longitudinal sectional view as taken along the line 4—4 in Fig. 2;

Fig. 5 is an enlarged sectional detail view on line 5—5 in Fig. 1; and

Fig. 6 is a reduced plan view, illustrated similarly to Fig. 2, showing the location of a vehicle to be elevated by the lift.

With reference to the drawing the hoist of this invention is shown in Fig. 1 as including a pair of oppositely arranged transversely spaced hoists, designated generally as 10, of a like construction and mounted within a common floor pit 11 formed within the floor surface 12. Only one of the hoists 10, therefore, will be referred to in detail in the following description and like numerals will be used to designate like parts in the hoist.

Each hoist 10 includes a cylinder 14 operatively associated with a piston or lift member 16. Mounted on the upper end of a piston 16 is a vehicle frame engaging and supporting member 17 which includes a longitudinally extended base plate 18 of a substantially flat rectangular shape attached to the piston 16 as by screws 19. The base plate 18 is secured as by welding, to the central portion of an elongated longitudinally extended beam member 21 of an upright T-shape in transverse cross section. Transverse brace members or gusset plates 22 (Figs. 1 and 5) project upwardly from opposite ends of the base plate 18 and are connected to the underside of the flat horizontal section 23 and to opposite sides of the upright section 24 of the beam member 21. The upright or vertical section 24 constitutes a brace rib for the horizontal section 23 of the beam 21. For additionally strengthening the beam member 21 there is secured to the underside of the brace rib or vertical section 24, a pair of bar members 26 arranged at opposite ends of the base plate 18, and with each bar 26 terminating short of, or spaced inwardly from, a corresponding end 27 of the beam 21.

When a piston 16 is in a lowered position, as shown in Fig. 4, the upright section 24 of the beam member 21 has the central portion thereof received within the floor pit 11, and the end portions thereof received within floor slots or openings 28, extended longitudinally of the hoist, in opposite directions from the floor pit 11. In other words, a pair of slots 28 and floor pit 11 form a continuous longitudinal opening for receiving a vertical brace section 24 therein. When the brace section 24 is thus received within the slots 28 and the floor pit 11, the bottom side 29 of the horizontal beam section 23 rests directly on the top of the floor surface 12 (Fig. 3) in a covering relation with its corresponding pair of slots 28 and with that portion of the floor pit 11 which underlies the central portion of the beam 21. It is contemplated that the horizontal section 23 be of a relatively narrow thickness so that in the lowered position of the piston 16, and with the horizontal section 23 resting directly on the floor 12, the floor space occupied by the hoist is capable of being normally used, namely vehicles and the like, can freely travel thereover.

That portion of the floor pit 11 located between the beam members 21 is covered by a stationary cover plate 31 having hinged end sections 32. Those portions of the pit 11 to the outside of the beam members 21 are covered by hinged cover members 33. Corresponding hinged cover members 32 and 33 at the ends of the floor pit 11, when in their pit covering positions, have their adjacent sides located a distance apart so as to receive therebetween the horizontal beam section 23 (Fig. 2).

As best appears in Fig. 5, the base plate 18 is of a wider dimension than the horizontal beam section 23. Also, as best appears from Fig. 1 the transverse dimension of the base plate 18 is slightly less than the diameter of a piston or lift member 16. Thus on the raising of a hoist 10, the hinged cover members 32 and 33 are initially engaged and moved upwardly by the pistons 16, and as the elevation of the piston 16 is continued, the inner adjacent sides of a corresponding pair of cover members 32 and 33 merely ride on opposite side portions of the piston 16, as shown in Fig. 1.

When the hoists 10, therefore, are in their elevated positions, corresponding pairs of hinged cover members 32 and 33 are inclined toward each other in supported positions on a corresponding piston 16, so as to constitute upright guards for that portion of the pit 11 located between such cover members. Also, the slots 28 are of a width in the neighborhood of about two inches. Thus when the hoist is in a raised position, garage and servicemen are effectively prevented from having a foot slip within the slots 28 or within that portion of the floor pit 11 adapted to be covered by the hinged members 32 and 33.

In the operation of the lift, the hoists 10 are initially in their lowered positions with the horizontal beam sections 23 supported on the floor surface 12. A vehicle, indicated in dotted lines at 36 in Fig. 6, is then driven over the hoist in a direction parallel with the beam members 21 to a position such that the members 21 are located between the vehicle front wheels 37 and rear wheels 38 in a direction longitudinally of the vehicle 36. The hoists 10 are spaced a distance apart corresponding substantially to the transverse dimension of the vehicle 36 to provide for the engagement of the side frame members 39 of the vehicle main frame or chassis 41 by the horizontal beam sections 23 when the hoists 10 are elevated. It is to be noted that the location of the beam members 21 between the front wheels 37 and rear wheels 38 of the vehicle 36 takes place without regard to the wheel base of the vehicle 36.

On elevation of the pistons 16 to raise the vehicle 36 the lower sides of the vehicle frame members 39 may be directly engaged by the top sides of the horizontal beam sections 23. Since the beam members 21 are of a length corresponding substantially to the distance between the front wheels 37 and the rear wheels 38 of a vehicle, the vehicle is positively supported against both lateral and longitudinal tilting movement. Due to the transverse spacing of the hoists 10, and the extension of the frame supporting or beam members 21 longitudinally of the vehicle and along opposite sides thereof, a maximum working space is afforded to a serviceman or mechanic for repairing or lubricating parts on the underside of the vehicle.

In some bus and truck installations the location of exhaust manifolds, and other undercarriage parts, may be such as to interfere with a direct engagement of the horizontal beam sections 23 with the frame members 39. For this purpose, each beam member 21 is provided with a pair of block members, indicated generally as 42, (Fig. 1). Each block member 42 includes a base member 43 of a substantially flat rectangular shape having the ends 44 thereof terminating in underturned hooks for receiving therein the side portions of a horizontal beam section 23. A base member 43 is thus supported for slidable movement longitudinally of a beam member 21, but by virtue of its hooked end portions 44 is retained against movement transversely of and upwardly from a corresponding beam member 21. Rotatably supported at 46 on the base member 43 is a rotatable arm member 47 which terminates in an upright socket 48. Adaptor members of various shapes and lengths, such as 49, have pin portions 51 receivable in a socket 48. Thus, a wide latitude in the location of an adaptor 49 is accomplished by virtue of its rotation to positions at either side of, and at spaced distances longitudinally of a corresponding beam member 21.

To facilitate the assembly and the removal of a block member 42 relative to a horizontal beam section 23, each section 23 at a longitudinally central position thereon is formed with a pair of oppositely arranged cutaway recesses 52, so as to provide a central portion in each beam member section 23 of a reduced width. As a result, a block member 42 is capable of removal from either end of a beam member 21, or at its center portion at the recesses 52, whichever location is the most convenient in the manipulation of the block members 42. It is to be understood, of course, that the block members 42 are removed from the beam members 21 prior to the hoists 10 being moved to lowered positions therefor.

The pistons 16 are raised and lowered in a usual manner by a hydraulic control system which includes an air control valve 61 and an oil control valve 62. These valves are conveniently located near each other at positions above the floor 12 for concurrent actuation by the hoist operator. Oil under pressure is supplied concurrently to the cylinders 14 on actuation of the oil valve 62, so that the pistons 16 are simultaneously operated in response to a manipulation of the oil control valve 62.

To assure a positive unified movement of the pistons 16 there is provided a synchronizing mechanism which includes a transverse shaft 53 (Figs. 1 and 4) extended between the hoists 10 and mounted in the floor pit 11. Each end of the shaft 53 is rotatably supported in a bracket member 54 which is secured directly, as by screws 56 to the upper end of a corresponding cylinder 14. Also, each end of the shaft 53 carries a pinion 57 which is operatively associated with a tubular upright rack member 58 having its upper end secured as by welding to the underside of a corresponding base plate 18 and which is guidably supported within a tubular casing 59 arranged in a parallel relation with a corresponding cylinder 14.

In the operation of the hoists 10 the lowering or raising of either hoist provides for a like movement of the other hoist regardless of the load distribution on a hoist, so that the pistons 16 operate together as a unit.

From a consideration of the above description it is seen that the invention provides a hoist which is of a simple construction, economical to manufacture and install, and substantially universal in its application particularly to trucks and busses. Further, no objectionable or hazardous floor openings occur when the hoists 10 are either in raised or lowered positions therefor, so that a full and clear walking space is provided at all times by the floor surface occupied by the hoist. Also, full accessibility is given to all of those parts on the underside of the vehicle, including both front and rear wheel and axle assemblies.

Although the invention has been described and illustrated with respect to a preferred embodiment thereof, it is to be understood that it is not to be so limited since changes and modifications can be made therein which are within the full intended scope of this invention as defined by the appended claim.

I claim:

For elevating a vehicle having a main frame, a vehicle lift including a pair of transversely spaced lift members mounted in a floor pit movable to lowered positions within said pit below the level of the floor surface, a pair of longitudinally extended frame supporting members corresponding to said lift members, means mounting a supporting member intermediate the ends thereof on a corresponding lift member, with each of said frame supporting members being integrally formed with a flat horizontal section having a downwardly projected reenforcing section on the underside thereof, frame contact members supported on said horizontal sections for slidable movement longitudinally thereof, coacting interlocking portions on said frame contact members and horizontal sections for holding said contact members against transverse and upward movement relative to said horizontal sections, with said horizontal sections being of a reduced width at a centrally located portion thereof to provide for the removal of the contact members from said horizontal sections at said centrally located portions, said floor surface having a pair of transversely spaced longitudinal slots formed therein of a width greater than the width of said reinforcing sections but less than the width of said horizontal sections whereby when said lift members are in a lowered position said reinforcing sections are received in said slots and said horizontal sections extend across said slots so as to be supported on the floor surface.

ELMER B. THOMPSON.

REFERENCES CITED

The following references are of record in the file of this patent:

UNITED STATES PATENTS

| Number | Name | Date |
|---|---|---|
| 948,843 | Booth | Feb. 10, 1910 |
| 2,458,986 | Frey | Jan. 11, 1949 |
| 2,593,635 | Walker | Apr. 22, 1952 |